Dec. 25, 1962 W. E. TURK 3,070,720
TELEVISION CAMERA TUBES
Filed Oct. 26, 1959
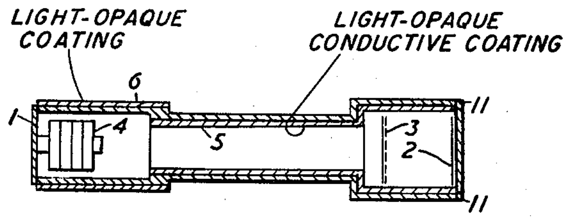
INVENTOR
Walter Ernest Turk
BY
Baldwin & Wight
ATTORNEYS

3,070,720
TELEVISION CAMERA TUBES

Walter Ernest Turk, Chelmsford, England, assignor to English Electric Valve Company Limited, London, England, a company of Great Britain Filed Oct. 26, 1959, Ser. No. 848,667
Claims priority, application Great Britain Oct. 29, 1958
4 Claims. (Cl. 313—65)

This invention relates to television camera tubes, and more specifically to television camera tubes of the kind including a photo-cathode adapted to receive an optical image of a subject of transmission and to translate the same into photo-emission for the purpose of the production of picture signals. The principal, though not the exclusive, application of the invention is to so-called image orthicon television camera tubes.

It is usual practice at the present time to mount image orthicon and like television camera tubes of the kind referred to, in enclosing camera box-mounts. Nowadays, however, television camera tubes of the kind referred to are frequently so large and their power consumption with that of their associated ancilliaries (mainly focusing and deflecting coils) is so large that the enclosing box-mounts have to be ventilated and they are accordingly commonly provided with ventilating louvres. Experience has shown, however, that when television camert tubes enclosed in louvred box-mounts are used in the intense and varied lighting of television studios, the picture signals developed are often such that the resulting reproduced pictures show undesirable shading effects. This has been found to be due to stray light entering the box-mount through the louvres and reaching the photo-sensitive surfaces via transparent envelope parts other than the window behind which the photo-cathode is situated. In a normal known image orthicon tube, for example, the envelope is light transparent in the neighbourhood of the hood of the gun unit beyond the point where the normally provided internal metallic coating of the tube ceases. As a result, existing known image orthicon and like camera tubes, even though wholly contained in louvred box-mounts are apt to produce, when used in studio conditions of intense lighting, picture signals which are degraded by interference by stray light, the degree of degradation being additionally objectionable because it is not constant but is likely to change with change in the position or aspect of the camera, since the amount of stray light reaching the photo-cathode via the louvres in the box-mount is likely to change as the camera is moved. The present invention seeks to avoid these defects and to provide improved television camera tubes which can be satisfactorily used in ordinary louvre-ventilated box-mounts even under conditions of intense and variable lighting.

According to this invention in its broadest aspect, a television camera tube of the kind including a photo-cathode adapted to receive an optical image of a subject of transmission and to translate the same into photo-emission, has an envelope which is rendered light opaque in such manner as to eliminate all light paths from outside the tube to the photo-cathode except those light paths which pass through the window area to admit optical images to said photo-cathode.

According to a feature of this invention an image orthicon television camera tube of the kind in which the iner wall of the envelope is coated with a light-opaque conductive coating extending back from the neighbourhood of the photo-cathode at or near one end of the tube envelope but stopping short of the other end region of the tube envelope where the gun and dynode system of the tube is situated has its envelope covered externally over said other end region with light-opaque material so positioned and arranged as to eliminate all light paths to the photo-cathode except those which pass through the window area provided to admit the optical images to said photo-cathode.

In most present-day television camera tubes, and notably in present-day image orthicon tubes, there is an internal metallic deposit on the interior wall of the envelope extending back from the neighbourhood of the photo-cathode of the tube but stopping short of the other end region of the tube. This leaves transparent to light an area of the envelope wall between where the said deposit terminates and either the adjacent end of the envelope, or in the case of a tube having an end cap through which connections are passed, the adjacent end of said cap. In accordance with this invention the said area, which in a known tube is transparent to light, is covered with light-opaque material so as to eliminate light paths to the photo-cathode other than those through the window area which is at the photo-cathode end of the tube and serves to admit optical images to said photo-cathode. The light-opaque material provided in accordance with this invention may take any of a variety of forms, e.g. it may be light-opaque paint sprayed or otherwise deposited on the required area of the envelope wall or it may be a plastic deposited in some convenient way as by dipping the envelope in plastic, or it may take the form of an opaque shrinkable cap or sleeve of the type commonly employed for sealing bottles of chemicals, or, in the cases of a tube having an opaque connection-carrying end cap at the gun end of the envelope, said cap may be made long enough to overlap the normally provided internal metallic coating.

The invention is illustrated in the accompanying drawing which shows in highly simplified form one embodiment of the invention.

Referring to the drawing, this represents an image orthicon tube, the glass envelope of which is indicated by the reference 1 and has the usual enlarged bulb-like end 11 in which is situated the photo-cathode 2 and the target structure 3. At the other end of the envelope 1 is what is herein termed the gun unit structure 4 which comprises the usual gun and dynode system. The electrode units 2, 3 and 4 are only diagrammatically indicated since they form no part of this invention and are well known. In accordance with normal image orthicon practice, the interior wall of the envelope is provided with a metallic deposit which extends back from near the photo-cathode, but stops short of the region in which the gun unit structure is situated. It is in general impracticable, for electrical reasons, to continue this interior coating over the gun unit structure. In the drawing, the interior coating in question is indicated by an internal thickening 5 of the line representing the envelope 1. It is, of course, also common to provide an end cap (not shown) over the end of the envelope where the gun unit structure is situated. This end cap, which carries connections passing through the cap into the tube to the various electrodes, never, however, extends up to or even near the end of the metal deposit 5. The result is to leave transparent a length of the envelope wall on the gun side of the termination of the interior coating 5.

In accordance with this invention this hitherto transparent portion of the envelope wall is treated externally to render it opaque to light. This may be done in any of a variety of different ways, e.g. by painting with an opaque paint or covering with an opaque plastic, or by an opaque shrinkable cap or sleeve such as is commonly used for sealing chemical bottles or, in the case of a tube having an end connector cap, by making that cap much longer than it is made at present and of such length as to extend over the end of the exterior coating 5. In the drawing the light-opaque coating provided by this invention is represented by an exterior thickening of the representation of the envelope wall and is indicated by the reference 6. The overall result is to eliminate all light paths to the photo-cathode except those passing through the window through which, in use, images are focused on the photo-cathode.

I claim:

1. An image orthicon television tube comprising an envelope, having photo-cathode at one end thereof, a gun unit at the other end thereof, and a window area adjacent said photo-cathode, a conductive coating on the inner wall, extending from the region of the photo-cathode to a region short of the gun unit, and an external covering of light-opaque material in the region of said gun unit and extending at least to one end of said interior coating to eliminate all light paths to the photo-cathode, except those which pass through said window area.

2. A tube as claimed in claim 1 wherein the light opaque material is paint deposited over said gun unit region.

3. A tube as claimed in claim 1 wherein the light opaque material is a plastic covering over said gun unit region.

4. A tube as claimed in claim 1 wherein the light opaque material is in the form of an opaque shrinkable cap or sleeve covering over said gun unit region.

References Cited in the file of this patent

UNITED STATES PATENTS

| | | |
|---|---|---|
| 1,910,578 | Tillyer | May 23, 1933 |
| 2,090,922 | Von Ardenne | Aug. 24, 1937 |
| 2,177,676 | Soller | Oct. 31, 1939 |
| 2,244,245 | Ehrenberg | June 3, 1941 |
| 2,256,300 | Van Mierlo | Sept. 16, 1941 |
| 2,810,087 | Forgue | Oct. 15, 1957 |